June 10, 1969    W. TIRASPOLSKY ET AL    3,449,030
BALL THRUST BEARING FOR DRIVING SHAFT SUBJECTED TO AXIAL
THRUST, PARTICULARLY FOR TURBODRILL SHAFT
Filed June 29, 1967    Sheet 1 of 2
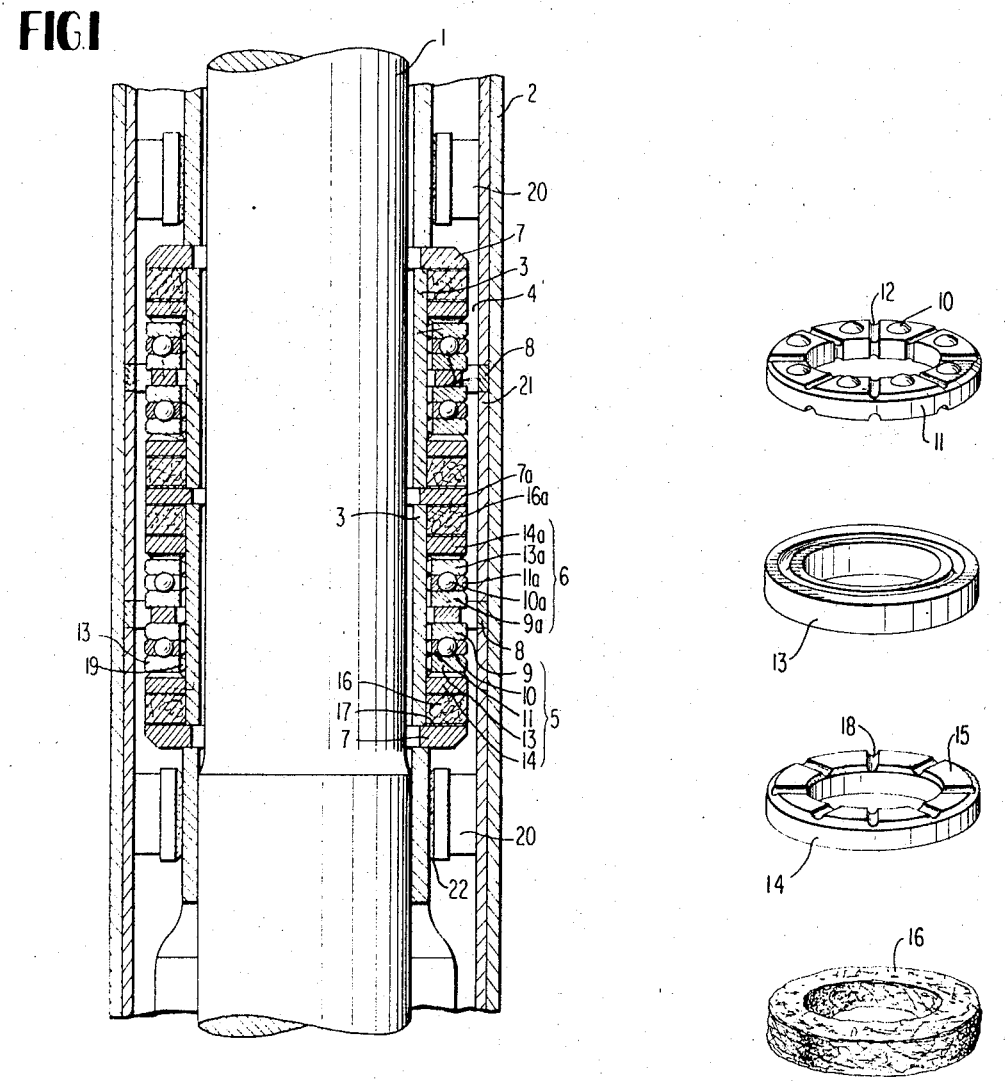
FIG.1
FIG.1a
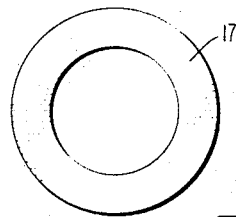
FIG.1b
INVENTORS
Wladimir Tiraspolsky
Roger Rouviere
BY Craig & Antonelli
ATTORNEYS June 10, 1969 W. TIRASPOLSKY ET AL 3,449,030
BALL THRUST BEARING FOR DRIVING SHAFT SUBJECTED TO AXIAL
THRUST, PARTICULARLY FOR TURBODRILL SHAFT
Filed June 29, 1967

INVENTORS
Wladimir Tiraspolsky
Roger Rouviere

BY Craig & Antonelli

ATTORNEYS

United States Patent Office 3,449,030
Patented June 10, 1969

3,449,030
BALL THRUST BEARING FOR DRIVING SHAFT SUBJECTED TO AXIAL THRUST, PARTICULARLY FOR TURBODRILL SHAFT
Wladimir Tiraspolsky, Issy-les-Moulineaux, and Roger Rouviere, Aix-en-Provence, France, assignors to Institut Francais du Petrole des Carburants et Lubrifiants, Rueil-Malmaison, Hauts-de-Seine, France
Filed June 29, 1967, Ser. No. 649,949
Claims priority, application France, July 1, 1966, 67,989
Int. Cl. F16c 19/10
U.S. Cl. 308—230                        7 Claims

ABSTRACT OF THE DISCLOSURE

A ball thrust bearing composed of a plurality of coaxial elements distributed between two complementary stages for absorbing opposed axial thrusts, wherein each stage includes a ball bearing having one of its races joined to an axial bearing element connected to either a stator part or the driving shaft by a connection which, at least in the absence of a blocking of the ball bearing, is non-rotative. Each stage further including a safety element in contact with one of the ball races and slidable thereon with a friction factor at least equal to the friction factor of the balls on the ball races, and an elastic damping element in a precompressed state, whose characteristics of compressibility are such that its flattening during the assembling, under the action of a precompression having a value smaller than the maximal compression thrust during operation, is greater than the supplemental flattening which results of the application of the maximal thrust.

Figure 3:
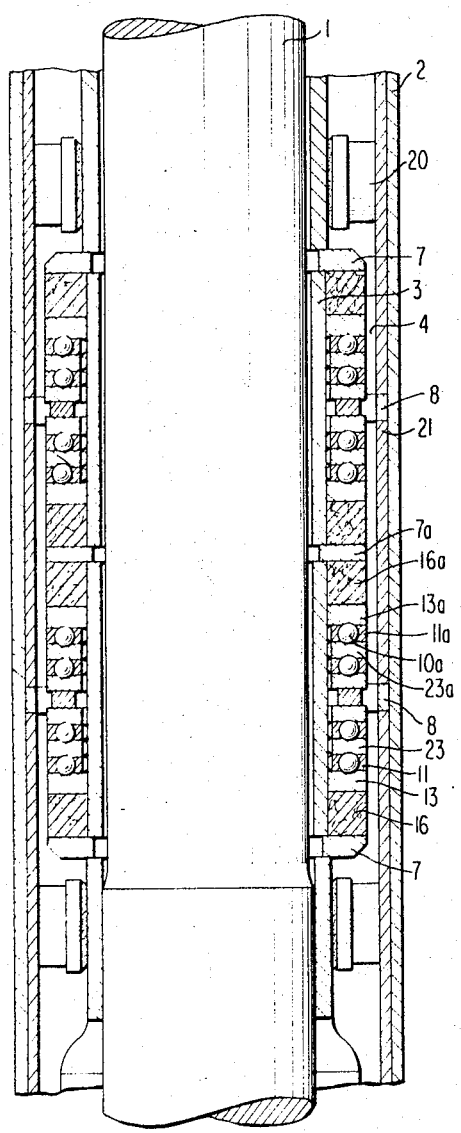

The present invention relates to a new type of ball thrust bearing for driving shaft subjected to axial stresses, particularly for turbodrill shaft, this thrust bearing having an increased reliability and being able to provide a much longer mechanical life than ball thrust bearings of other types which have been experimented up to now.

In the following, reference will be made, by way of illustrative example only, to the use of a thrust bearing according to the invention as a thrust bearing for turbodrill.

After several unsuccessful trials to build reliable ball thrust bearings, the industrial developments of turbodrills during the past thirty years has been completely based upon the use and prefecting of sliding bearings using the couple metal-rubber and lubricated by the drilling fluid feeding the turbodrill.

At the actual level of development of the turbodrill engineering, some functional irreductible drawbacks of the sliding thrust bearings, such as the high value of the axial wear, the complex form of the function existing between the friction coefficients in the bearing, the speed of rotation of the shaft and the specific pressure applied to the elements of this bearing, the sensivity of the rubber elements to vibrations and increases in temperature, etc. result in a more and more troublesome bridle on the evolution of the sliding thrust bearings toward increased efficiency.

The problem became thus that of building reliable ball thrust bearings with the hope that it could be possible to dispose of improved means as a result of the metallurgical and technological progresses which had been acomplished in the meantime in other technical fields.

In spite of numerous trials, nobody so far succeeded to build ball thrust bearings able to compete economically with the best sliding thrust bearings available.

The ideal solution of a watertight ball bearing working in a bath of suitable lubricating oil still comes up against the difficulty of insulating this bearing from the ambient medium.

Other difficulties have gone against an equilibrated distribution of the loads between the successive stages of a multiple-stage thrust bearing and their protection against vibrations.

Some trials to realize this protection by means of aborbing rubber pads have been unsuccessful, since these pads appeared to be as brittle, if not more, as the bearings themselves.

Another danger arose from the possible brutal liberation of the inertial forces, as a result of the sudden breaking of an element in the bearing, such as, for example, a ball, or a ball race.

The ball thrust bearing according to the invention eliminates these drawbacks by allowing:

(a) to distribute the axial stresses or thrusts in both directions in a balanced way, between a sufficient number of elemental or unit stages, so as to protect these stages against any excessive overload, (b) to lubricate the moving parts of the bearing by means of the circulating drilling fluid, while at the same time protecting as well as possible these moving parts against the intrusion of abrasive particles, (c) to prevent any axial tossing in operation, (d) to limit the resisting torque between the rotor and stator masses in case of the blocking of one or more ball bearings, (e) to protect the moving parts against the most noxious axial vibrations.

According to the invention a ball thrust bearing is constituted by a succession of stages each of which is inserted, along one or the other direction, between a rotor axial seat and a stator axial seat, each stage, which may or not be identical to the other, comprising at least:

A ball ring comprising between the two ball races of a type known per se and optionally guided by a ball cage, An intermediate safety element or rotation relay, which may be constituted by one or more ball rings similar to the first one, placed in series, or by two sliding surfaces, one of which being for example covered with a lining made for example of rubber and such that the torque resulting from the friction on this lining is greater than that of the ball bearings, An axial elastic element having such a law of flattening, as a function of an axial compression, that a precompression of the order of $\frac{1}{10}$ to $\frac{1}{4}$ of the total load or thrust provides a stroke which is greater than one half of the total stroke, thereby providing for the elements of the stacking which constitutes one stage of the thrust bearing a minimal permanent compression during all the phases of its working.

In order to make it possible, when necessary, to simplify as much as possible the assembling, by elimination of such fittings as rivets, pins, stopping elements, etc., the bearing surfaces of the non-rotative elements of each stage in contact with the damping elements have been knurled so as to provide a friction factor which is much higher than the friction factors involved during the rotation of the rolling elements or of the safety elements, this friction factor easily reaching or even exceeding the value 1.

The compressible parts of the above-menioned elastic element will be of metal or elastomer and in particular, will advantageously consist of metallic braids of high resistance wires agglomerated under pressure, or of a combination of such materials and the distribution of the axial strokes under the action of compression thrusts during working will be obtained either through the own characteristics of the material, as in the case of the metallic braids, or as the result of the successive putting into service of elements the elastic resistance of which is added.

The novel application of rings made of metallic wire fabric to the realization of damping elements for thrust bearings, associated or not with other elastic elements, constitutes one of the essential features of the invention resulting in a real technical progress. These bumper pads of metallic wire fabric cause a definitive damping of the absorbed vibrations, within a wide frequency range, contrarily to the rubber pads which have been used up to now, and this results, for comparable working conditions of the turbines, in a longer working life of the thrust bearings according to the invention.

Moreover, the flattening of the metallic wire pads which may be used in the thrust bearings of the invention tends asymptotically toward a limit value when the applied axial thrust is increased.

This characteristic is used, according to the invention, by providing during the assembling of the thrust bearing an axial precompression of the damping elements, so as to produce a flattening of the latter of an amplitude which is higher than the variations in thickness, which these elements might be subjected to during their operation, under the action of the applied axial thrusts. It results therefrom that any axial clearance or any axial tossing or swinging to and fro of the elements of the thrust bearing according to the invention become impossible during its working.

The intermediate safety element, which is in each stage of the thrust bearing associated with the ball bearing and with the elastic damping element, allows an uninterrupted operation in case of breaking of the ball bearing.

According to an interesting embodiment, this intermediate safety element is constituted by a metallic ring having a rubber face in contact with one of the ball races of the ball bearing, with a friction factor whose value is intermediate between those of the friction factor of the balls on this ball race and of the friction factor of the metallic wire pad or of its equivalent on the other face of the safety element, as a result of the knurling of this last face.

Under these conditions the safety element relays the ball bearing in case of blocking of the latter, this safety element then sliding on the adjacent ball race, thereby avoiding the deterioration of the device and allowing in case of need to achieve the drilling run on hand.

Another feature of the thrust bearings according to the invention is that they are adapted to be lubricated and cooled by the drilling fluid circulating through the turbine.

Figure 2:
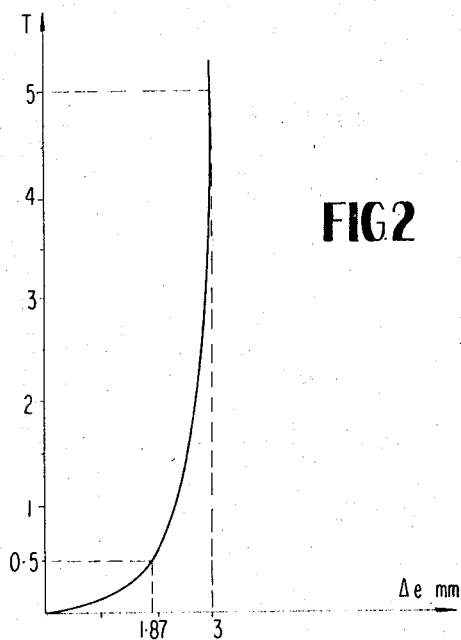
Figure 4:
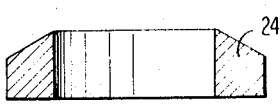
Figure 5:

Some non-limitative embodiments of the invention will be described hereinafter with reference to the annexed drawings wherein:

FIGURE 1 schematically illustrates a first embodiment of a thrust bearing according to the invention, FIGURE 1a shows the elements constituting this ball thrust bearing, FIGURE 1b is a view from below the intermediate safety element showing the knurled bearing face thereof, FIGURE 2 shows the form of the compressibility curve of a pad made of metallic wire fabric, which may be advantageously used as a damping element in the ball thrust bearings according to the invention, FIGURE 3 corresponds to a second embodiment of the invention, FIGURES 4 and 5 illustrate two embodiments of elastic elements which may be used in a ball thrust bearing according to the invention.

FIGURE 1 illustrates an embodiment of a ball thrust bearing according to the invention, comprising two stages for each of the two directions of application of axial thrusts.

The number of stages which must be at least one for each of these two directions is however not limited but is chosen as a function of the stresses or thrusts to bear, considering, on the one hand, the thrusts directed toward the drilling bit and, on the other hand the thrusts having the opposite direction, these thrusts not having necessarily the same value.

The rotor shaft of the turbodrill is indicated by the reference 1 on the different figures, 2 designating the stator body of this turbodrill, which may be of any suitable known type.

The annular elements constituting the ball thrust bearing according to the invention are stacked up in the annular space located between a rotor shell 3 surrounding the turbine shaft and the statoric distance pieces 21, leaving a free annular space 4 for the flow of drilling mud.

Known devices of any suitable type may be used for purifying this mud (centrifugal pumps, cyclones etc.) so as to reduce as much as possible the intrusion of abrasive particles between the moving parts of the thrust bearing or of collimating particles into the damping elements.

Each stage of the thrust bearing according to the invention can work in one of the two axial directions either alone or in combination with a similar stage working in the other direction.

One stage of the thrust bearing is designated by 5 on FIGURE 1 and the other by 6. These stages comprising the same parts, these parts have been designated by the same reference numerals with however the index $a$ for the elements of the stage 6.

Each stage is inserted between two seats which are integral with the rotor (seats 7, 7a) and with the stator (seat 8), respectively.

The statoric bearing elements are provided with channels for the circulation of the drilling fluid through the annular space surrounding the thrust bearing.

The two stages 5 and 6 are symmetrically located in opposition with respect to each other on both sides of the seat 8 and are constituted by the stacking up of several elements the first of which, reckoning from the seat 8, is a ball bearing with superposed ball races. One of these ball races (9, 9a) is nonrotatively fixed to the bearing element 8 (for example by insertion in said element).

The balls (10, 10a) of the ball bearing may be either free or housed in a ball-cage (11, 11a) which may advantageously be made of an elastomer lubricated by the drilling mud and having a low friction factor relative to the metal of which the balls and their ball-races (FIGS. 1 and 1a) are made.

Radial channels 12 are provided through these ball races for the flow of the drilling mud used for the lubrication (FIG. 1a).

When the working conditions are hard high resistance noble materials will be used for the balls and the ball races. Special balls may also be used such as the ones used in roller drill bits.

Adjacent to the ball bearing and in contact with the ball race (13, 13a) which is freely rotatable with respect to the rotor shaft is located an intermediate element (14, 14a) constituting a safety relay.

This element meets the danger presented by the ball thrust bearing and consisting in a brutal blocking in case of a sudden breaking of an element of the ball bearing, this blocking liberating very high inertial forces, since the rotary part of a turbodrill may weigh several tons, which might cause serious accidents.

In the embodiment illustrated by FIGURES 1 and 1a, the safety element is constituted by rubber pads slidable on the lower face of the ball race 13, 13a and comprises (FIG. 1a) a metallic ring 14 covered by a rubber lining (15), on its face which is in contact with the ball race 13.

Channels 18 (FIGURE 1a) are provided on this rubber-covered face for the circulation of the drilling mud realizing the lubrication in case this safety element is caused to rotate.

The friction factor of the balls on the ball races being smaller than the one of the rubber-covered thrust bearing (14, 15) on the ball race 13, the safety element remains stationary under normal working conditions, being not driven in rotation.

However in case of a sudden blocking of the ball bearing, the safety element (14, 15) works as a relay, the ring 14 then rotating, sliding on the ball race 13.

The rubber coating 15 on the ring 14 will be of small thickness (for example of the order of 2 mm.) but will however cause some damping of the axial vibrations.

Each stage of the ball thrust bearing also comprises an elastic damping element (16, 16a) compressed between the safety element 14 and the rotor seat (7, 7a).

According to an interesting embodiment of the invention, this safety element consists of one or several rings or pads of metallic wire fabric or of metallic braids, for example of the type used in the aeronautic construction. These rings will for example be made of high resistance stainless steel wire.

The present invention thus provides a new application of such rings or pads making use of two of their characteristics.

The first of these characteristics is illustrated by FIGURE 2 which shows the form of the curve of elastic deformation by compression of such a pad of metallic wire.

This curve shows the compression force T expressed in tons which produces a given flattening e, expressed in millimetres. This curve has an asymptote and, in the example which has been chosen for illustrative purpose, a compression of 500 kg. causes a flattening of 1.87 mm. of the pad, while a compression on 5 tons increases this flattening only by 1.13 mm. (total flattening 3 mm.), these values been given only as order of magnitude.

The damping pads 16 are, according to the invention, precompressed during the assembling of the ball thrust bearing, for example under the action of a hydraulic jack before keying the rotor seat 7 at the end of the stage of the ball thrust bearing.

This precompression is of sufficient value (for example 500 kg. in the case of a pad having the compressibility curve of FIGURE 2) so that the corresponding flattening of the pad (1.87 mm. in this case) is higher than the supplemental flattening which would result of the application of the maximal axial compression thrust which is admissible for the stage considered during its operation (1.13 mm. if this maximal thrust is 5 tons).

It results therefrom that no clearance tossing or swinging to and fro can arise between the elements of this ball thrust bearing, since the supplemental flattening of a pad such as 16 (FIG. 1), under the action of an upward directed axial thrust applied to the shaft 1 of the turbine, and the value of which corresponds to the maximum allowable thrust, for example 5 tons, only permits an upward displacement of 1.13 mm. of the stator seat 7a, i.e. an axial expansion of 1.13 mm. of the opposed damping pad 16a, which expansion is not sufficient to take up the flattening of 1.87 mm. which this elastic element has undergone from its precompression during the assembling.

The second characteristic of the damping rings or pads made of metallic wire fabric 16 is that they completely absorb the vibrations within a wide frequency range, contrarily to the rubber rings used for the damping in some types of ball thrust bearing which have been previously built for the turbodrills, since rubber retransmits at different frequencies all the received vibrations.

It appears however that the speed of destruction of the pads varies with their axial position.

Thus, the metallic pads located at the ends of the stacking which constitutes the ball thrust bearings often become faster destroyed than those having a central location, which can be imputed to a concentration of low frequencies in these areas.

Since rubber and more generally elastomers have a greater resistance to the destroying action of the low frequencies, they may be used either alone or in combination with rings of metallic braids.

For example rings of elastic material, particularly of elastomer, may be used, such as the ring 24 shown in axial section on FIGURE 4, having the form of a trapezium in axial section, which substantially realizes the compression curve illustrated by FIGURE 2, characterizing the metallic wire pads.

In the embodiment shown by FIGURES 1, 1a and 1b, the respective faces of the intermediate safety element (14, 14a) and of the rotor seats (7, 7a) which are in contact with the damping pad (16, 16a) (bearing faces) are knurled as shown by FIG 1b which is a view from below the sliding bearing 14 illustrated by FIGURE 1a (showing the face which is opposed to that covered with rubber 15).

The knurling 17 provides a maximal friction factor between the pad 16 and the adjacent elements.

Tests have shown that it was thus possible to exceed a friction factor of 1, which is sufficient to prevent any sliding during the operation.

This provides a progression of the values of the mutual friction factors of the elements which constitute each stage of the ball thrust bearing from one end to the other end of this thrust bearing, this being one of the features of the ball thrust bearing according to the invention.

In the embodiment illustrated by FIGURE 1, the elements of the ball thrust bearing according to the invention which are liable to rotate around the turbine shaft (ball races 13, 13a, ball cages 11, 11a) are provided on the walls of their axial bores with rubber shoes 19 slidable on the rotor shells 3 during the rotation of the shaft.

The reference 20 on FIGURE 1 designates centering bearings for the shaft 1 of the turbine, these bearings being rubber-covered on the walls of their axial bore and sliding on wearing liners 22.

The embodiment of the present invention according to FIGURE 3 mainly differs from the preceding in that the intermediate element acting as a safety relay between the ball bearing and the damping pad of metallic wire fabric is constituted by a second ball bearing which replaces the rubber sliding surface of the preceding embodiment.

The intermediate double-faced ball race 23, which is common to the two superposed ball bearings is freely rotatable about the shaft 1.

During the operation of the turbine each of the two ball bearings rotates at any speed comprised between zero and the speed of the shaft.

In case of blocking of one of the two twin-ball bearings, the other one continues to rotate alone until the end of the operation.

This embodiment of the safety relay which consists in increasing the number of ball bearings for each stage (more than two ball rings for each stage of the ball thrust bearing may be used), has the advantage of increasing the reserve of revolutions (or of working hours) which is available before the ball bearings are worn out, but it leads to a lengthening of the ball thrust bearing with respect to the preceding embodiment.

The other elements of the ball thrust bearing of FIGURE 3 are similar to those described with reference to FIGURE 1. The same references have been used on these two figures to designate the corresponding elements.

It will obviously be possible to use jointly the two embodiments of the safety relay, which have been respectively illustrated by FIGURES 1 and 3, by replacing in the embodiment according to FIGURE 1 the single ball bearing by a twin- or multiple-ball bearing, while keeping the rubber sliding relay 14 applied against the lower ball race of the ball bearing.

As previously indicated with reference to FIGURE 4 as an example, it will be possible to replace the rings 16, 16a of metallic wire fabric or braid by other elastic elements having damping properties, which are precompressed at the assembling and have in common with these rings the characteristic of having, under the action of a precompression when they are placed into position, a flattening which is greater than half of the total flattening under the action of the maximal axial thrust during the operation of the ball thrust bearing.

Such elements may be constituted by metallic springs, for example of corrugated elastic sheet-metal, with such a profile that the compression characteristics is a curve of exponential or asymptotical type, such as the curve shown by FIGURE 2. These elements may also result (FIG. 5) of the association of concentric rings of elastic material, for example of elastomer, such as the rings 25 and 26 which fits into each other and are so designed that, when the axial compression increases, successive rings are put into service, the elastic resistance of which is added.

What is claimed is:

1. A thrust bearing arrangement comprising: a driving shaft subjected to axial thrusts; a stator part; said stator part and shaft having integral axial bearing elements; a thrust bearing constituted of coaxial elements surrounding said driving shaft and distributed between at least two antagonistic stages which resist opposed axial thrusts and are located between said axial bearing elements respectively integral with the driving shaft and with a stator part, each stage of said thrust bearing being constituted by the combination of at least one ball bearing consisting of a ball ring located between two ball races, at least one of said ball races being joined to one of said axial bearing elements by means of a connection which, at least in the absence of a blocking of said ball bearing, is non-rotative, of a safety element in contact with one of said ball races and slidable thereon with a friction factor at least equal to that of the balls on said ball races, and of an elastic damping element in a precompressed state, whose characteristics of compressibility are such that its flattening during the assembling, under the action of a precompression having a value smaller than the maximal compression thrust during operation, is greater than the supplemental flattening which results of the application of said maximal thrust.

2. Thrust bearing according to claim 1, wherein said safety element consists of a ring acting as sliding bearing and covered with an elastomer on its face in contact with a ball race.

3. Thrust bearing according to claim 1, wherein the elastic damping element is located between an axial seat integral with the driving shaft and the safety element, and wherein the respective faces of said axial seat and of said safety element which are in contact with said elastic damping element are knurled to increase the friction factor.

4. Thrust bearing according to claim 1, wherein said elastic damping element is constituted by at least one ring of metallic wire fabric.

5. Thrust bearing according to claim 1, wherein said elastic damping element is constituted by at least one ring of elastic material having a substantially trapezoidal axial section.

6. Thrust bearing according to claim 1, wherein said elastic damping element is constituted by at least two concentric rings of elastic material, said rings having their end faces located at different axial levels.

7. A thrust bearing arrangement comprising: a driving shaft subjected to axial thrusts; a stator part; said stator part and shaft having integral axial bearing elements; a thrust bearing constituted of coaxial elements surrounding said driving shaft and distributed between at least two antagonistic stages which resist opposed axial thrusts and are located between said axial bearing elements respectively integral with the driving shaft and with a stator part, each stage of said thrust bearing being constituted by the combination of at least one ball bearing consisting of a ball ring located between two ball races, and of an elastic damping element in a precompressed state, whose characteristics of compressibility are such that its flattening during the assembling, under the action of a precompression having a value smaller than the maximal compression thrust during operation, is greater than the supplemental flattening which results of the application of said maximal thrust.

References Cited

FOREIGN PATENTS 1,170,717    5/1964    Germany.

MARTIN P. SCHWADRON, *Primary Examiner.*

FRANK SUSKO, *Assistant Examiner.*